United States Patent
Silva et al.

(10) Patent No.: US 12,556,531 B2
(45) Date of Patent: Feb. 17, 2026

(54) SYSTEM AND METHOD FOR MERGING GRAPHICAL USER INTERFACES OF SEPARATE COMPUTING APPLICATIONS

(71) Applicants: Atlassian Pty Ltd., Sydney (AU); Atlassian Inc., San Francisco, CA (US)

(72) Inventors: Bruno Siqueira Silva, Sydney (AU); Adolfo Eloy Nascimento, Sydney (AU); Nils Jonathan Moritz Grauel, Sydney (AU); Chaoyang Zeng, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 327 days.

(21) Appl. No.: 17/565,374

(22) Filed: Dec. 29, 2021

(65) Prior Publication Data
US 2023/0208829 A1 Jun. 29, 2023

(51) Int. Cl.
| | |
|---|---|
| H04L 9/40 | (2022.01) |
| H04L 9/32 | (2006.01) |
| H04L 67/561 | (2022.01) |
| H04L 67/563 | (2022.01) |
| H04L 67/567 | (2022.01) |

(52) U.S. Cl.
CPC .......... *H04L 63/083* (2013.01); *H04L 9/3213* (2013.01); *H04L 67/561* (2022.05); *H04L 67/563* (2022.05); *H04L 67/567* (2022.05)

(58) Field of Classification Search
CPC ... H04L 63/083; H04L 67/563; H04L 67/567; H04L 67/561; H04L 9/3213
USPC ........................................................ 709/217
See application file for complete search history.

(56) References Cited

U.S. PATENT DOCUMENTS

| | | | |
|---|---|---|---|
| 2003/0220969 A1* | 11/2003 | Kojima | G06F 16/958 |
| | | | 707/E17.116 |
| 2006/0041637 A1* | 2/2006 | Jerrard-Dunne | H04L 67/567 |
| | | | 709/219 |
| 2006/0168221 A1* | 7/2006 | Juhls | H04L 67/567 |
| | | | 709/225 |
| 2009/0083646 A1* | 3/2009 | Lin | G06F 16/9577 |
| | | | 709/219 |

(Continued)

*Primary Examiner* — Suraj M Joshi
*Assistant Examiner* — Ayele F Woldemariam
(74) *Attorney, Agent, or Firm* — Brownstein Hyatt Farber Schreck, LLP

(57) ABSTRACT

A method and non-transitory computer readable medium to access a resource. The method includes: receiving at the primary product platform associated with a primary client, a request for accessing a resource hosted by a secondary product platform independent from the primary product platform, the request received from the primary client; generating and forwarding a uniform resource locator (URL) pointing to a proxy servlet of the primary product platform to the primary client, the URL generated based on an identifier of the requested resource; receiving, from the primary client, at the proxy servlet, a request for HyperText Markup Language (HTML) data of the requested resource, retrieving, by the proxy servlet, from the secondary product platform, the HTML data of the requested resource; rewriting the HTML data; and communicating the rewritten HTML data to the primary client for rendering in a user interface.

18 Claims, 6 Drawing Sheets

(56) References Cited

U.S. PATENT DOCUMENTS

2010/0180330 A1* 7/2010 Zhu ...................... H04L 63/102
  726/10
2018/0102950 A1* 4/2018 Ameling ............. G06F 9/44505
2021/0385217 A1* 12/2021 Benko ................. H04L 63/0815

* cited by examiner

HR Solutions
Service Project

⊕ Back to project

Queues
Customers
Reports
Raise a request
Knowledge Base

{issue title}

Details
Type:
Priority:
Labels:

Description
I want to install a softphone on Linux and need a 3rd party advanced SIP device account Status:
Resolution:

People
Assignee:
Reporter:
Request participants:
Organization:

Dates
Created:
Updated:

Related knowledge base articles

Using 2FA security -- Adding a new phone

I need new hardware or software

I want to setup outlook email

SYSTEM AND METHOD FOR MERGING GRAPHICAL USER INTERFACES OF SEPARATE COMPUTING APPLICATIONS

TECHNICAL FIELD

Aspects of the present disclosure are directed to computer applications and more particularly to integrating independent computer applications to provide a common frontend.

BACKGROUND

Typically computer applications are created to offer specific features to users. For example, one computer application may be developed to provide an online real time chat service whereas another computer application may be developed to deliver another service, such as online collaboration for projects. Over time, many developments may be made in both computer applications as they grow and each computer application may have a rich and complex backend system that supports the corresponding computer application.

Over time, situations may arise where it might be beneficial to integrate the features of one of the computer application with features offered by the other computer application—e.g., it might be beneficial to offer the real time chat service of the first computer application to a collaboration service offered by the second computer application or vice versa.

Accordingly, there exists a need for simpler, more efficient mechanism for introducing the features of an one computer application to another computer application.

SUMMARY

Example embodiments described herein are directed to a computer-implemented method. The method includes receiving at a primary product platform associated with a primary client, a request for accessing a resource hosted by a secondary product platform independent from the primary product platform.

The request is received from the primary client. The method further includes generating and forwarding a uniform resource locator (URL) pointing to a proxy servlet of the primary product platform to the primary client. The URL may be generated based on an identifier of the requested resource. The method further includes receiving, from the primary client, at the proxy servlet, a request for HyperText Markup Language (HTML) data of the requested resource; retrieving, by the proxy servlet, from the secondary product platform, the HTML data of the requested resource; rewriting the HTML data; and communicating the rewritten HTML data to the primary client for rendering in a user interface.

Some example embodiments are directed to a system. The system includes a processor and a non-transitory computer readable medium comprising instructions, which when executed by the processor, cause the system to perform the steps of the method described above.

Other example embodiments are directed to non-transitory computer readable medium which when executed by a processor causes the processor to perform the method described above.

BRIEF DESCRIPTION OF THE DRAWINGS

In the drawings:

FIG. 5 is an example user interface rendered by the primary product client displaying an agent view user interface according to some aspects of the present disclosure.

Figure 1:
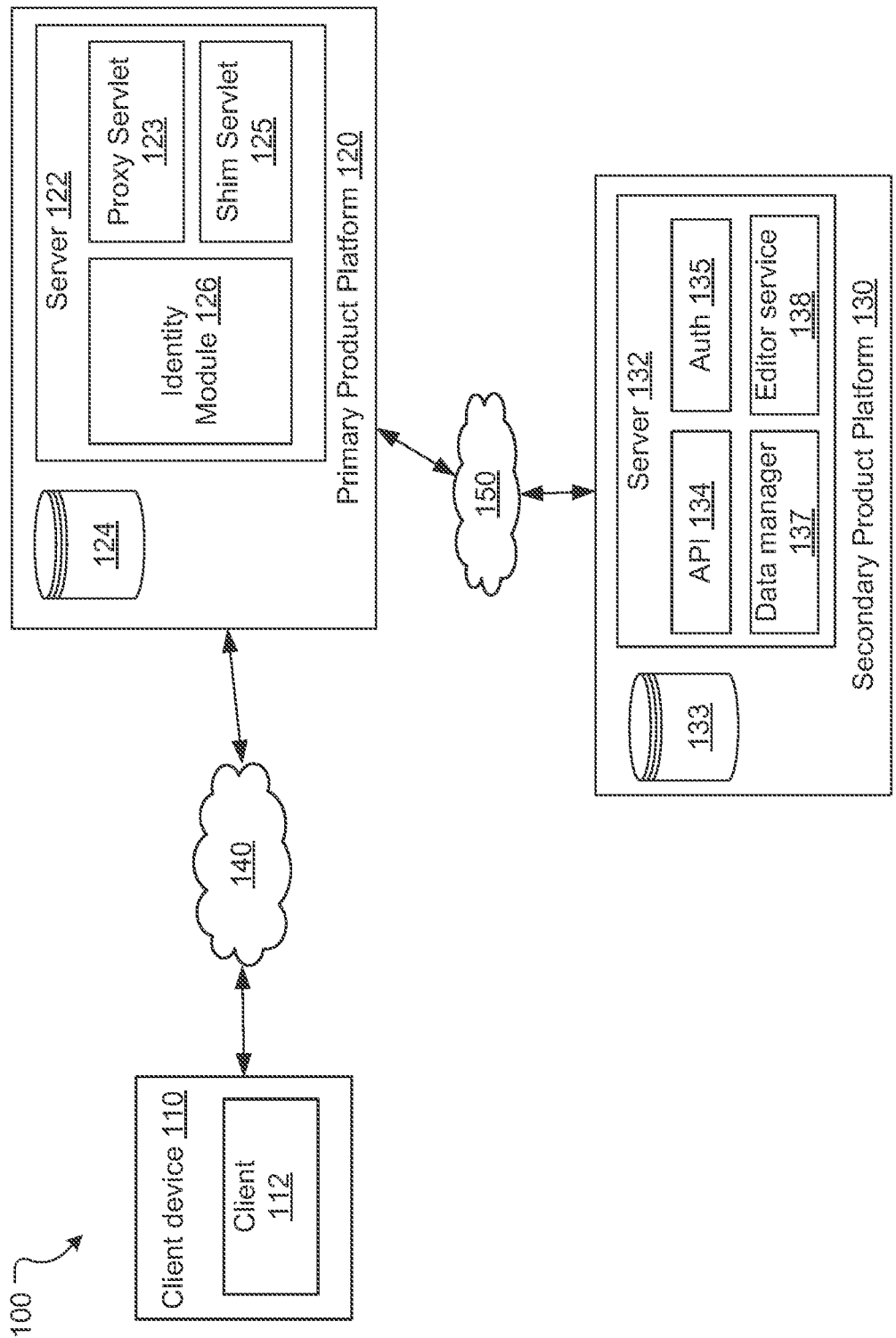
FIG. 1 is a block diagram depicting a networked environment in which various features of the present disclosure may be implemented.

While the description is amenable to various modifications and alternative forms, specific embodiments are shown by way of example in the drawings and are described in detail. It should be understood, however, that the drawings and detailed description are not intended to limit the disclosed embodiments to the particular form. The intention is to cover all modifications, equivalents, and alternatives falling within the scope of the present disclosure as defined by the appended claims.

DETAILED DESCRIPTION

In the following description numerous specific details are set forth in order to provide a thorough understanding of the various embodiments as disclosed herein. It will be apparent, however, that the embodiments presented herein may be practiced without these specific details. In some instances, well-known structures and devices are shown in block diagram form in order to avoid unnecessary obscuring.

As discussed above, situations may arise where it might be beneficial to incorporate the features of one computer application into another computer application. However, the two computer applications are often developed by different parties, totally independently and without any regard to the possible future integration with other computer applications. Therefore, the process of integrating two existing computer applications often involves solving numerous technical compatibility issues in order for the existing products to function together in a relatively cohesive fashion. In such cases, it might be possible to develop the features offered by the first computer application into the second computer application. However this may be too computationally expensive, may require many man hours to accomplish and even then, the newly developed features may not be able to replicate the quality of the features offered by the first computer application (which has been refined over time).

For example, consider the situation where one computer application is an issue tracking system (ITS) and another computer application is a server-based collaboration system or corporate wiki. Issue tracking systems are systems that manage the creation and tracking of issues or tickets in a variety of contexts. An issue is an item with associated information (e.g., a title and a brief description) and an associated workflow—i.e., a series of states through which the issue transitions over its lifecycle (e.g., pending, assigned, in process, completed).

As one example, an ITS may be deployed for use by a service helpdesk—e.g., an IT service helpdesk in a large organization. A busy service helpdesk may manage thousands, tens of thousands, or even more issues. Each issue may have a different priority, require different actions, be handled by different people, and/or be handled by multiple different people over its lifecycle. An ITS may be used to assist in managing and tracking this process. When a problem is submitted to the helpdesk, an "issue" is created and assigned (at times with a particular priority). As the issue is worked on by various users, the progress of the issue is recorded and tracked by the ITS until, ideally, the issue is resolved and closed.

Further, some ITSs may include multiple projects—e.g., containers within which all issues, items, and communications about a given theme are maintained. For instance, an organization may create and maintain multiple projects e.g., such that each team in the organization has its own project— e.g., a customer service project, a finance project, an HR project, a legal services project, and so on.

Once projects are created, project data such as project name, associated teams of agents, organization, and so on, is stored by the ITS in a relational manner to the issue data maintained for each project.

As part of the service helpdesk, the ITS may wish to maintain a knowledge base—that is, e.g., a collection of documents related to the issues solved by the service helpdesk such as 'how to' documents, known bugs/problems with software, or any other such documents that may aid agents to complete tasks/issues and may help users identify possible solutions to issues even before raising issues. However, the ITS may not have developed any product features to provide such a knowledge base.

A wiki computer application, on the other hand, provides just such a service. It allows users to create and view dynamic content pages. Further, such wiki computer applications handle the storage, security, and permission issues associated with document creation and management.

In some examples, the wild computer application may store the content pages in different spaces. A space is a container for pages and blog posts with related content. For example, if the same organization maintains the wiki computer application, it may create spaces corresponding to the ITS projects. For example, it may create a customer service space, a finance space, an HR space, a legal services space, etc. Teams can then store articles/blogs associated with their ITS project in the corresponding spaces in the wild computer application.

As discussed above, the ITS can develop its own knowledge base capabilities. However it is not only difficult to introduce the features of one computer application in another computer application by developing those features from scratch, it is also very expensive to do so, consumes more computational resources, may take a very long time (sometime years) and may even result in inferior features to those offered by the other computer application.

Additionally or alternatively, the ITS may buy a license to a known wiki system and provide a link to the wiki system in the ITS user interface. For example, user can add links to corresponding wiki spaces in their projects. This way, if an ITS user needs to view or create any pages, the ITS user can select the wiki link and his/her computer can be redirected to the wiki system where the user can create/view page the desired pages. They can also embed links to the individual pages into their ITS to later view/edit the pages. Although this is a feasible option, it provides a very disjointed experience to users. Users have to constantly juggle between the two product platforms, which provides a rather tedious user experience.

Further, customers of the ITS would also need access to or be registered to use the wiki system to be able to view the knowledge base documents. This may not pose a problem in cases where the users are registered users of both platforms (e.g., administrators or agents of the ITS). However, it may be a problem in cases where the users are customers of the organization that uses the ITS and simply wish to view articles hosted by the wiki computer application without being registered users of the wiki as well. Similarly, this may not be a problem when both computer applications share the same user base. However, if the computer applications do not share the same user base, the user may be required to log/sign into the wiki application each time the user selects a link directed to the wiki computer application.

To overcome some of these issues, aspects of the present disclosure provide an integrated computer application that provides the functionality of two or more independent computer applications. In particular, aspects of the present disclosure provide a unified frontend (i.e., a unified experience for a user) of an integrated computer application, while maintaining the backend systems (i.e., the separate independent server systems) of the two or more computer applications as independent systems. This way, there is no need to replicate the functionalities of a computer application in another computer application or vice versa. Instead, users can interact with a unified frontend, while any requests made by the user in the frontend can be provided to the respective backend applications for fulfillment.

To this end, aspects of the present disclosure assign one of the computer applications as a primary computer application and the other computer application can be assigned as a secondary computer application. The primary computer application is responsible for providing a unified frontend experience to the user and communicating with the secondary computer application to update that computer application based on actions performed by users on the unified front end and also to retrieve services/features offered by the secondary computer application to present to the user via the unified frontend.

Further, to allow users that are not registered with the primary or secondary computer application (referred to as 'unregistered users' in this disclosure), but who may wish to access resources hosted by the secondary computer application via a primary computer application, the primary computer application utilizes one or more proxy servers. The proxy server may be configured to add authentication information to resource requests received from the primary computer application front end before communicating the request to the secondary computer application. Further, the one or more proxy servers may inspect the data received from the secondary server and replace any data (e.g., Uniform Resource Locator URL) that points directly to an endpoint of the secondary server with data that point to an endpoint of the one or more proxy servers. This way, any subsequent requests associated with a given secondary computer application resource displayed on a user device are routed to the one or more proxy servers.

This way, the proxy servers intercept all requests destined for the secondary application and can add authentication data to such requests before communicating them to the secondary computer application.

Further still, in some examples, one or more dummy user accounts may be created in the secondary computer application and the user credentials associated with this user account may be stored in the primary product platform. When unregistered users make requests for resources maintained by the secondary product platform, the proxy servers can add these dummy user credentials in the resource requests. The secondary product platform can then authenticate the dummy user credentials and provide access to the requested resources (based on the permissions associated with the dummy user account). Further, if unregistered users try accessing resources hosted by the secondary product platform anonymously (e.g., via incognito mode or not logged in to the service desk system), the proxy servers forward these anonymous access requests to the wiki system. In this way, the proxy servers respect the permissions rules of the wiki system and at the same time limit access to the anonymous access request. In such case anonymous use cases, the user is provided access to the wiki pages if the resource is open to public or all users.

As described herein, the secondary computer application may be a server-based application—i.e., an application that is executed and hosted by an organization's own infrastructure and an application whose data is also stored on the organization's own infrastructure (usually behind a firewall). Server-based applications may be useful in cases where a product or organization has to comply with strict regulatory standards, or in cases where product data is sensitive and cannot be hosted on the cloud. The primary computer application may be a cloud-based application or a server-based application.

Further, in some examples, the primary and secondary computer application may have different user bases that are independently maintained by the two computer applications.

These and other features of the presently disclosed systems and methods will be described in detail in the following sections with reference to FIGS. 1-6. Further, it will be appreciated that features of the presently disclosed systems and methods are described time and again in this disclosure with respect to an ITS (such as Jira Service Management offered by Atlassian) as a primary computer application and a web-based wiki system (such as Confluence offered by Atlassian) as a secondary computer application. In such examples, the object requested by the primary computer application client is referred to as a page. However, it will be appreciated that this is merely exemplary and the described systems and methods can just as easily apply when the primary and secondary computer applications are any other computer applications and when the object is any resource maintained by the secondary computer application.

Further, although the following systems and methods describe a single secondary computer application in communication with a primary computer application, this need not be the case. Instead, in some implementations, a primary computer application may be able to communicate with multiple secondary computer applications to provide resources hosted by multiple secondary computer applications in the integrated frontend without departing from the scope of the present disclosure. In such cases, the primary computer application may include independent proxy servers for each connected secondary computer application or may include one or more common proxy servers that act as an intermediary for multiple secondary computer applications.

Example System

FIG. 1 illustrates an environment 100 in which one or more aspects or embodiments of the present disclosure are implemented. Specifically, FIG. 1 illustrates the systems involved in integrating two computer applications and providing a unified frontend. The systems include a client device 110, a primary product platform 120, and a secondary product platform 130. The client device and product platform 120 communicate with each other over a communication network 140 and the product platforms 120, 130 communicate with each other over a communication network 150.

The client device 110 may be any device suitable for performing client-side operations described herein, for example a mobile device (e.g., a tablet or mobile phone), a portable device (such as laptop computer), or any other computing device (e.g., a desktop computer).

Generally speaking, users of the client device 110 are associated with one or more user accounts and generate and/or communicate electronic content to the primary product platform 120. This activity includes any type of user account interaction with the primary product platform 120, including interaction with content and/or software applications hosted by the primary product platform 120. Example interactions include accessing/viewing and/or contributing to one or more issues hosted by the product platform 120, viewing, creating, editing one or more content pages, etc.

In order to allow users to perform these functions, as illustrated in FIG. 1, the client device 110 includes one or more client (software) applications (e.g., primary client 112) that is configured to access software applications made available by the primary product platform 120. The primary client 112 may communicate with the software application hosted by the product platform 120, render user interfaces based on instructions received from the application, and receive inputs from user accounts allowing them to interact with the application hosted by the primary product platform 120.

The primary client 112 includes instructions and data stored in the memory (e.g. non-transient compute readable media) of the client device 110 on which the application is installed/run. These instructions are executed by a processor of the client device 110 to perform various functions as described herein. By way of example, some functions performed by the primary client 112 include communicating with a primary application hosted by the primary product platform 120, rendering user interfaces based on instructions received from the primary application, and receiving inputs from users to interact with content made available by the primary product platform 120. In certain embodiments, where the primary and secondary computer applications are ITS and a wild system, respectively, the primary client 112 renders user interfaces that show one or more pages hosted by the wild system, allow users to create or modify such pages.

The primary client 112 may be implemented in various ways. For example, the primary client 112 may be a web browser application, which accesses the application hosted by the product platform 120 via appropriate uniform resource locators (URL) and communicates with the primary product platform via general world-wide-web protocols. In this case, the web browser application is configured to request, render and display user interfaces that conform to a markup language, and may be capable of internally executing browser-executable code, or other forms of code. Additionally or alternatively, the primary client 112 may be a specific application programmed to communicate with the primary product platform 120 using defined application programming interface (API) calls.

In general, each product platform 120, 130 is a system entity that hosts one or more software applications and/or content. Each product platform 120, 130 may include one or more servers (e.g., 122 and 132) for hosting corresponding software application(s) and one or more storage devices (e.g., databases 124 and 134) for storing application specific data. Examples of software applications hosted by the primary product platform 120 may include incident management systems (e.g., OpsGenie), software code management system (e.g., Bitbucket), issue tracking applications (e.g., JIRA), web-based, Kanban-style, list-making applications (e.g., Trello). Software application hosted by the secondary product platform can be a web-based collaboration wild application (e.g., Confluence). Confluence, Trello, Jira, OpsGenie, and BitBucket are all offered by Atlassian, Inc. It will be appreciated that the software applications need not be offered by the same organization and that the embodiments disclosed herein can be used with any primary product application configured to interact with any secondary product application without departing from the scope of the present disclosure.

The server 122 includes one or more application programs, libraries, APIs, or other software elements that implement the features and functions of the application. In particular, the server 122 includes one or more proxy servers or servlets. In one example, the server 122 includes a proxy servlet 123 and a shim servlet 125. The proxy servlet 123 is configured to receive a request to view a resource hosted by the secondary product platform, add authentication data to the request, communicate the request to the secondary product platform 130, receive HTML data, inspect the HTML data, rewrite the HTML data if it includes any resources, and communicate the rewritten HTML data to the client 112. The shim servlet 125 may be configured to receive request for resources (e.g., images, JAVASCRIPT files, CSS files, and so on) hosted by the secondary product platform 130, add authentication data to the request, communicate the request to the secondary product platform 130, receive resources from the secondary product platform 130 and communicate the request to the client 112. In some embodiments, the server 122 further includes an identity module 126 that is a user base integration system configured to manage the user base for the primary product platform 120 and access tokens to access the secondary product platform 130 on behalf of users of the secondary product platform 130. In particular, the identity module 126 manages authentication data for users of the primary product platform and manages access tokens for users of the secondary product platform that are also users of the primary product platform 120.

The server 132 of the secondary product platform 130 also includes one or more application programs, libraries, APIs, or other software elements that implement the features and functions of the application. For instance, it may include an authorization module 134 and a data manager 136. The authorization module 134 is configured to receive a permissions request, where the permission request may include an identifier for a secondary product platform resource and a user identifier of the user wishing access to the secondary platform resource. The authorization module 134 determines whether the user identifier is valid and has permission to view the requested resource. If sufficient permissions are determined, the authorization module 134 grants access to the requested resource. Otherwise, it generates an error message.

The data manager 136 is configured to receive requests to view resources and fulfills these requests if the requests are accompanied with the correct permissions.

The product platforms 120, 130 also store product data. Product data generally includes: data defining the operation of the hosted application (for example, user accounts, user permissions, and the like); and application data (i.e., the content hosted/maintained by the application, which can be, for example, issue data (in an ITS product platform), project data, page and space data (in a collaboration/wiki system), or any other type of integrated object data. The data is stored on and managed by databases 124, 133. Database 124, 133 may be provided by a database server (not shown) which may be hosted by server 122, 132, but is more typically hosted on a separate physical computer in communication (directly or indirectly via one or more networks 150) with the servers 122, 132.

In one example, database 124 stores authentication data for users of the primary product platform. The database 124 may also store one or more dummy user credentials to be used with the secondary product platform 130 for resource requests when the requesting user is not a registered user of the primary or secondary product platform.

Similarly database 133 stores authentication data for users of the secondary product platform. This database may also store one or more dummy user credentials that are created by the secondary product platform for unregistered users of the primary product platform.

While single server architecture has been described herein, it will be appreciated that one or both of the product platforms 120, 130 can be implemented using alternative architectures. For example, in certain cases a clustered architecture may be used where multiple server computing instances (or nodes) are instantiated to meet system demand Conversely, in the case of small enterprises with relatively simple requirements a product platform 120, 130 may be a stand-alone implementation (i.e., a single computer directly accessed/used by the end user).

As illustrated in FIG. 1, communications between the various systems are via the communication networks 140, 150. FIG. 1 depicts two communication networks to clearly show that client device 110 is in communication with the primary product platform 120 directly, but does not directly communicate with the secondary product platform 130 and to show that the secondary product platform 130 communicates with the primary product platform 120 directly, but not with the client device 110. However, it will be appreciated that the two networks 140, 150 may be the same. That is, in actual implementation, the various systems illustrated in FIG. 1 may communicate with each other the same communication networks. For example, the product platforms 120, 130 may communicate with each other through a public network (e.g., Internet) and the primary product platform 120 may communicate with the client device 110 also via the same public network (e.g., the Internet). In other cases, if both the primary and secondary product platforms are server-based systems, they may communicate with each other via a private network (e.g., LAN). Furthermore, the product platforms 120, 130 may communicate with each other over open web protocols such as (HTTPS, REST, and JWT).

As described above, primary client 112 is configured to interact with the primary product platform 120. Further, the primary and secondary product platforms 120, 130 may interact with each other in the background. In this manner, the user only needs to have a user account with the primary product platform 120 and interact with the primary product platform 120 via the primary client 112 whilst enjoying the functionalities provided by the secondary product platform 130 as well.

It will be appreciated that although only one client device 110, and one secondary product platform 130 has been depicted, in normal operation, many more client devices 110 and/or secondary product platforms 130 may be connected to the primary product platform 120 through the network 140.

The operations/techniques described herein are implemented by one or more special-purpose computing systems or devices. For example, in environment 100: the client device 110 is a computer system and the product servers 122, 132 are provided by one or more computing systems.

The special-purpose computing devices may be hardwired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hardwired logic, ASICs, or FPGAs with custom programming to accomplish the techniques. The special purpose computing devices may be desktop computer systems, portable computer systems, handheld devices, networking devices or any other device that incorporates hard-wired and/or program logic to implement relevant operations.

Figure 2:
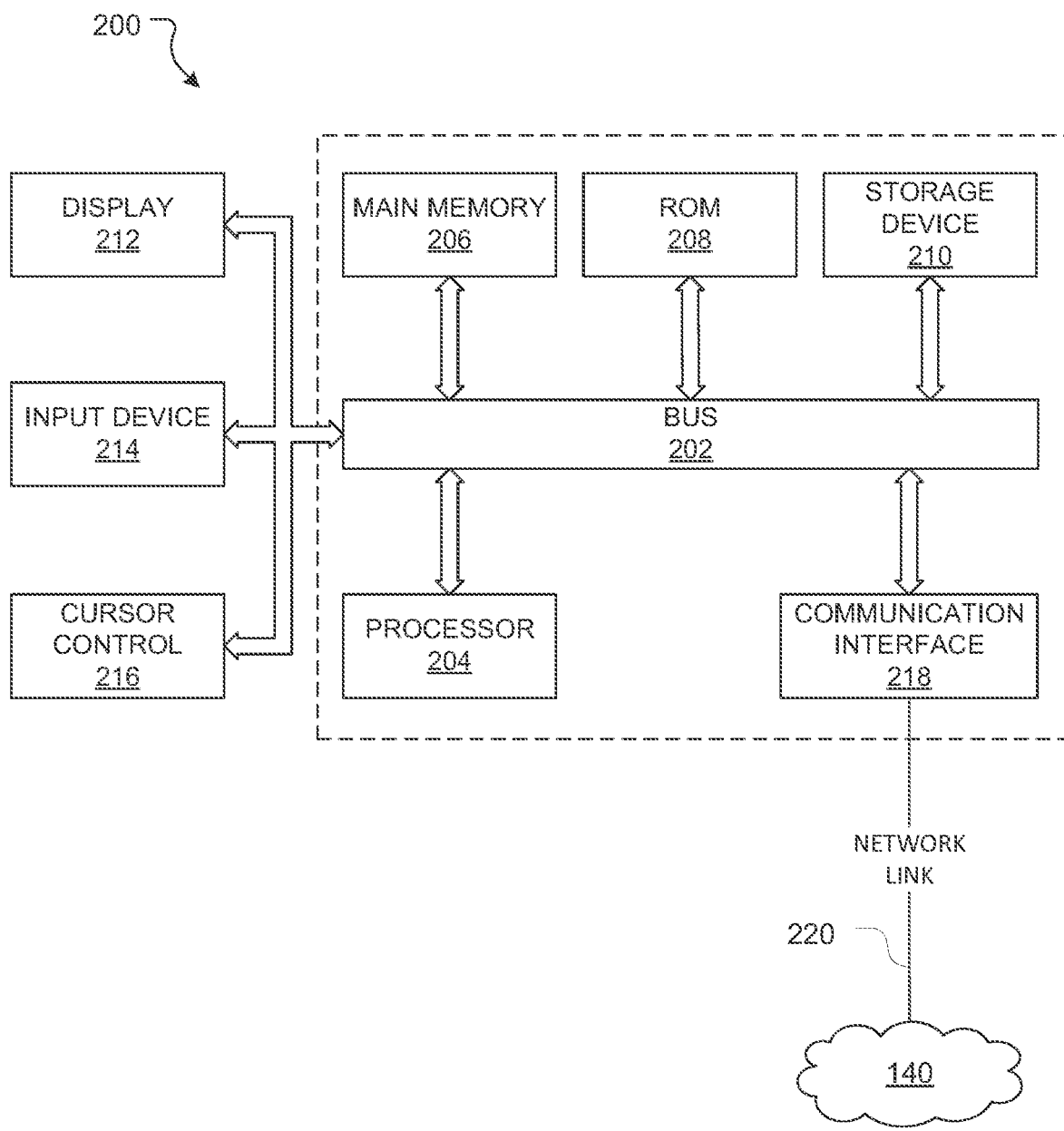
FIG. 2 is a block diagram of a computer processing system configurable to perform various features of the present disclosure.

For example, FIG. 2 is a block diagram that illustrates a computer system 200 upon which an embodiment of the present disclosure may be implemented. Computer system 200 includes a bus 202 or other communication mechanism for communicating information, and a hardware processor 204 coupled with bus 202 for processing information. Hardware processor 204 may be, for example, a general purpose microprocessor.

Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Such instructions, when stored in non-transitory storage media accessible to processor 204, render computer system 200 into a special-purpose machine that is customized to perform the operations specified in the instructions.

Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

In case the computer system 200 is the client device 110, it may be coupled via bus 202 to one more output devices such as a display 212 for displaying information to a computer user. Display 212 may, for example, be a cathode ray tube (CRT), a liquid crystal display (LCD), a light emitting diode (LED display), or a touch screen display. An input device 214, including alphanumeric and other keys, may be coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that permits the device to specify positions in a plane. Additional and/or alternative input devices are possible, for example touch screen displays.

According to one embodiment, the methods disclosed herein are performed by computer system 200 in response to processor 204 executing one or more sequences of one or more instructions contained in main memory 206. Such instructions may be read into main memory 206 from another storage medium, such as storage device 210. Execution of the sequences of instructions contained in main memory 206 causes processor 204 to perform the process steps described herein. In some embodiments, hardwired circuitry may be used in place of or in combination with software instructions.

The term "storage media" as used herein refers to any non-transitory computer readable media that stores data and/or instructions that cause a machine to operate in a specific fashion. Such storage media may comprise non-volatile media and/or volatile media. Non-volatile media includes, for example, optical or magnetic disks, such as storage device 210. Volatile media includes dynamic memory, such as main memory 206. Common forms of storage media include, for example, hard disk, solid state drive, magnetic tape, or any other magnetic data storage medium, a CD-ROM, any other optical data storage medium, any physical medium with patterns of holes, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor 204 for execution. For example, the instructions may initially be carried on a magnetic disk or solid state drive of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to network 140. For example, communication interface 218 may be an integrated services digital network (ISDN) card, cable modem, satellite modem, or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks 360 to other computing systems. For example, if the computer system 200 is the client device 110, the network link 220 may provide a connection through network 140 to the primary product platform 120.

Computer system 200 can send messages and receive data, including program code, through the network(s), network link 220 and communication interface 218. In the above example, the computer system 200 may receive resource data through the network 140 and communication interface 218 from the shim servlet 125. The processor 204 executing the client 112 in the client device 110 may render the received resource data for display on a user interface of the client device 110.

User Identifiers

In one example, the resources requested from the secondary product platform 130 are displayed in an iFrame in a user interface rendered by the primary client 112 on the client device 110. The iFrame renders a page/resource in a headless manner—i.e., without any head tags of a web page so that it can be embedded and displayed inside the primary user interface. The page includes scripts and tags for static web resources and metadata. If a user is authorized or permitted to view a page, it is displayed within the iFrame. If the user is not permitted to view the page, an error message displayed in the user interface rendered by the primary client 112.

Further, as described previously, the primary product platform 120 may cater to two types of users—registered users and unregistered users. A registered user is a user that has created an account with the primary product platform 120 and may also have a corresponding account with the secondary product platform 130. An unregistered user may be a user that does not have any accounts with either the primary product platform or the secondary product platform. Instead, this user may be a customer of a helpdesk service provided using the primary product platform 120.

In case the user is a registered user, the primary product platform 120 and the secondary product platform 130 store user details such as username, password, tokens, etc. that uniquely identify the user. In some cases, these user details may be the same in both platforms (e.g., if the two systems have a common user base). In some cases, these user details may be different.

In any event, registered users may authorize the primary product platform 120 to retrieve resources from the secondary product platform on their behalf. In one example, this may be done using the identify module 126 and an authentication protocol such as OAuth. For example, the primary product server 122 may request the registered user to provide authorization and the user may grant this. Then, the primary product application and in particular the identity module 126 communicates this grant to the secondary product server 132, which determines whether the user is a registered user of the secondary product platform 130 and issues an access token to the primary product server 122 for use by the primary product platform 120 for the user. The identity module 126 may save this issued access token in database 124. Thereafter, whenever the primary product platform 120 needs to access resources for the user, the primary product platform 120 and in particular the identity module 126 retrieves the corresponding access token from the database 124 and passes the access token to the proxy or shim servlets, which include this access token along with a corresponding request to the secondary product platform 130. The secondary product platform 130 then assesses the access token/identifier and determines whether the user has permission to view the requested resource. If the user has permission to do so, the secondary product platform 130 returns data for the resource, which the user device can use to render the resource/page in the displayed user interface.

In some embodiments, instead of every registered user receiving the authorization request and granting authorization, an administrator of the primary product platform 120 may grant access for all registered users and the access tokens received from the secondary product platform 130 may be maintained in the database 124 along with the primary platform user credentials.

For example, the database 124 may store the following information:

A client ID: that uniquely identifies the entity requesting authorization on behalf of the user. In this case, the client ID is the ID of the primary product platform 120.

A secret: is a passphrase or a secret known only to the entity requesting authorization on behalf of a user and the authorization server of the secondary product platform. This is typically stored in an encrypted or hash form.

User IDs: this is a list of user ID of users of the primary product platform 120 that have authorized the primary product platform 120 to retrieve resources from the secondary product platform on their behalf.

Authorization URL: this is the URL of the secondary platform's authorization module 134 to which the resource requests have to be redirected so that the user can be authenticated and can consent to authorizing the primary product platform 120 to retrieve content on its behalf.

Exchange URL: Once the user provides consent, the authorization module 134 of the secondary product platform 130 generated a one-time token/code. The identity module 126 has to then exchange this one time token/code for an access key. The exchange URL is the URL of the secondary product platform's authorization module 134 which the identity module 126 has to contact to retrieve the access key.

A copy of the access keys that are generated and assigned to different entity and user account pairs is also stored in the database 133 of the secondary product platform.

In this manner, resources for registered users of the primary and secondary product platform can be retrieved from the secondary product platform 130 and displayed in the primary client 112.

Additionally or alternatively, if the user is an unregistered user, neither the primary product platform nor the secondary product platform store user details associated with the user. In such cases, access tokens cannot be used. Instead, in such cases, aspects of the present disclosure create a dummy user account in the secondary product platform 130 and provide user credentials (e.g., username and password) of the user account to the primary product platform 120 for storage. When the unregistered user wishes to view a resource hosted by the secondary product platform 130, the primary product platform 120 retrieves the dummy user credentials and passes these to the secondary product platform 130 along with a resource request. The authorization module 135 of the secondary product platform then checks if the credentials are valid and if the corresponding dummy user account has permission to view the requested resource. If both checks pass, the secondary product platform 130 returns data for the resource, which the client device 110 can use to render the resource/page in the displayed user interface.

Further, if the user is an anonymous user, no user details or dummy accounts are used. Instead, when an anonymous user wishes to view a resource hosted by the secondary product platform 130, the primary product platform 120 passes the resource request to the secondary product platform 120 without any user credentials. The secondary product platform 130 then checks whether the resource is open to public access. If the resource is open for public access, the secondary product platform 130 returns data for the resource, which the client device 110 can use to render the resource/page in the displayed user interface.

Example Methods

Methods for providing resources hosted by a secondary product platform via a primary product platform 120 independent from the secondary product platform will now be described. The operations of the methods described in FIGS. 3-4 will be described as being performed by the systems (e.g., client device 110, primary product platform 120, and secondary product platform 130) described in FIG. 1. In some embodiments, the processing described may be performed by one or more alternative systems (operating in conjunction with systems 110-130 or independently) and/or alternative applications running on those systems.

Further, the methods disclosed herein will be described with reference to example primary and secondary product platforms. In particular, the primary product platform 120 is considered to be an ITS platform (such as Jira Service Management or JSM) that creates, updates and manages issues and the secondary product platform 130 is considered to be an online collaboration wiki system (such as Confluence®) that can be used to create and manage documents or pages.

In one example, the requests for resources hosted by secondary product platform 130 may be generated via two different avenues—these avenues are referred to as portal view and agent view herein. In one example, the ITS may have a customer portal webpage that allows registered and unregistered users to view the knowledge base, search for articles, and view articles. Further, the ITS may include an agent interface that allows registered users of the ITS (e.g., agents and admin) to manage issues and at the same time view articles/pages or other resources hosted by the secondary product platform 130. The two different views may be associated with different functionalities. For examples, in the agent view, a user may be able to edit/create a page directly from the primary client 112, whereas in the portal view this functionality may be disabled.

Figure 3:
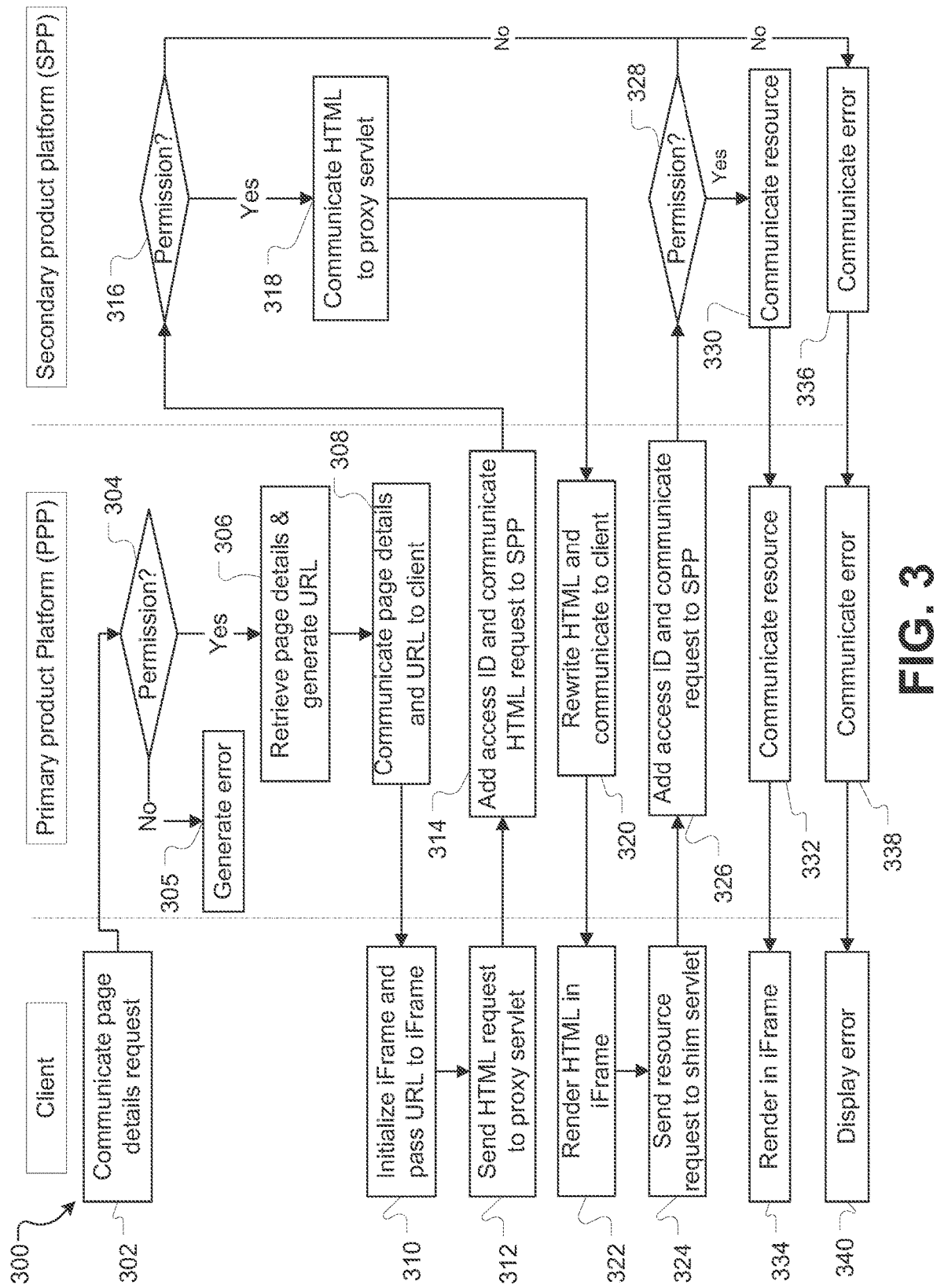
FIG. 3 is a flowchart illustrating an example method for accessing a resource hosted by a secondary product platform using a primary client according to aspects of the present disclosure.
Figure 4:
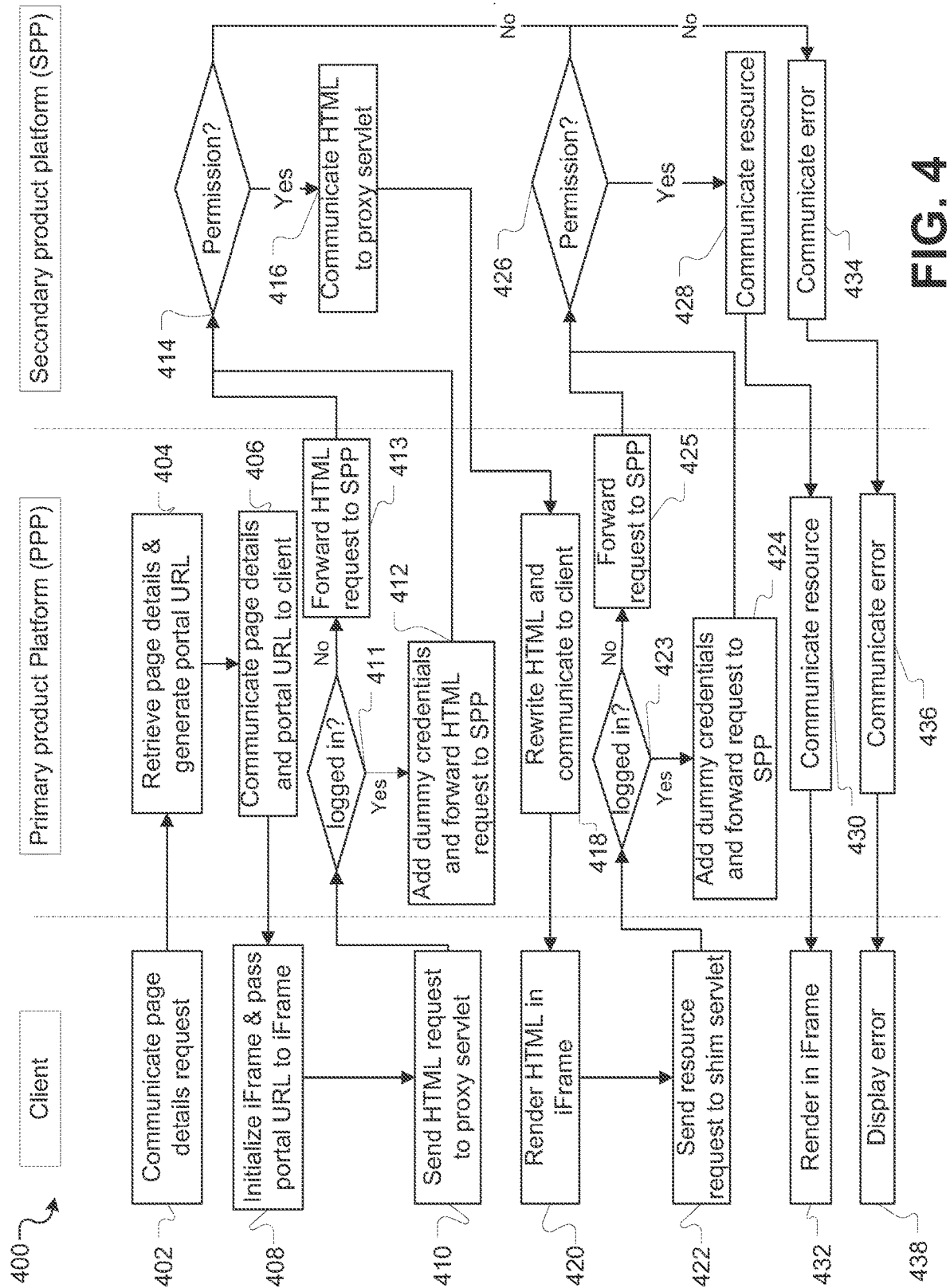
FIG. 4 is a flowchart illustrating another example method for accessing a resource hosted by a secondary product platform using a primary client according to aspects of the present disclosure.

In some embodiments, the process for viewing a page hosted by the secondary product platform 130 may be different depending on the particular avenue used to generate the page request—portal or agent view. FIG. 3 is a flowchart illustrating a method for accessing a resource hosted by the secondary product platform 130 using the agent view and FIG. 4 is a flowchart illustrating a method for accessing a resource hosted by the secondary product platform 130 using the portal view.

In both these processes, the request for accessing the resource is generated by a client associated with the primary product platform 120 (e.g., primary client 112). Further, in these example methods, the resource is a page. It will be appreciated that this is merely an example to help illustrate the processes more clearly.

A registered user (e.g., an agent or an administrator) may be viewing an issue in a given project on the client 112 on client device 110. FIG. 5 illustrates one such example user interface 400. The user interface 500 displays issue data such as issue title, details, description, people involved, service level agreements, etc. In addition, the user interface displays a list of knowledge base articles 501 related to the given issue. The user may select one of the article names from the list 501. For example, the user may select the article, 'I need new hardware or software' from user interface 500. This selection initiates method 300.

At step 302, the client 112 generates and communicates a page details request to the primary product platform 120. The page details request may include, e.g., a unique identifier of the requested page, a unique identifier associated with the user, and a unique identifier associated with the project.

The primary product platform 120 receives the page request and determines whether the user has primary product permission to access the selected article/blog. In particular, at step 304, a determination is made whether the user has access to the primary product project (to which the knowledge base article belongs). To this end, the primary product platform 120 checks whether the project identifier is valid, whether the user identifier is valid, and whether the user identifier has sufficient permission to view the project. If all checks are passed, the primary product platform determines that the user has permission. Otherwise it determines that the user does not have permission.

If a determination is made that the user does not have primary product permission to view the selected article, an error message is generated at step 305 and displayed to the user indicating that the user does not have sufficient permission to view the selected article/blog.

Additionally or alternatively, if at step 304 it is determined that the user has the required primary product permissions to view the selected page, the method proceeds to step 306 where the primary product server retrieves page details for the requested page. Examples of page details include secondary product platform page identifier, a URL for retrieving page HTML, identifier of the secondary product platform space the page is associated.

In one example, the primary product server 122 stores space keys and/or space identifiers (of the secondary product platform) in a relationship with the project keys and project identifiers (of the primary product platform). A space or project key is a short, unique identifier that forms part of the URL for that space or project whereas a space or project identifier is an identifier of the container in which the corresponding space or project is located. In one example, the project and space keys and identifiers may be stored as shown in table A below—

TABLE A

Project-Space correspondence table.

| Project Key | Project identifier | Space Key | Space identifier |
|---|---|---|---|
| HR_Management | 34726 | HR_System | 38947 |
| HR_Management | 34726 | HR_promotions | 98382 |
| IT_solutions | 49287 | IT_Solutions_System | 98470 |
| Customer_service | 39887 | Customer_Service_Desk | 09830 |
| . . . | . . . | . . . | . . . |

Further, in some examples, the primary product server may maintain unique primary product identifiers for the pages maintained in the knowledge base. These primary product identifiers may be different from the identifiers generated by the secondary product platform 130 for the corresponding pages. In such cases, the primary product platform 120 may maintain a correspondence data structure that stores the primary product identifiers and the associated secondary product platform identifiers.

In other examples, the primary product server 122 may maintain the same page identifiers as those maintained by the secondary product server. In such cases, the primary product platform 120 need not maintain a correspondence data structure.

In any event, at step 306, the primary product 120 may retrieve the page details from the one or more data structures it maintains. In addition, the primary product platform 130 generates a URL for retrieving the page HTML. This URL is constructed from the page identifier and the project key and/or space key associated with the page. Further, this URL points to an endpoint defined in the proxy servlet 123. In one example the URL may have the following format—

/servicedesk/knowledgebase/articles/server/view/{pageid}/agent/{projectID}

At step 308, the primary product server 122 communicates this URL to the client 112 in response to the page details request.

At step 310, the client 112 initializes an embedded viewer/iframe. In some cases, code for the iframe is passed to the client 112 when the user first executes the client 112 on the client device 110. This code or software may be installed and executed in the client 112 in the background while the user engages with a displayed user interface (e.g., user interface 500). Alternatively, the code may be downloaded from the primary server 122 but may only be executed when selection of a knowledge base page is detected.

In any event, once the iframe is initialized, the client 112 passes the URL it received from the primary server to the iFrame. The iFrame then sends a request to the proxy server endpoint the URL points to at step 312. In one example the request may be an HTTP request for the page HTML.

At step 312, the proxy servlet 123 is configured to generate and communicate a request to the secondary product platform 130 for HTML data for the requested page. However, before the proxy servlet 123 can communicate the request to the secondary product platform 130, it retrieves the access identifier/token for the requesting user and adds the access identifier to the request, which also includes the secondary product platform identifier for the page and the associated space identifier.

In one example, the proxy servlet 123 communicates the HTML data request and the user identifier to the identity module 126. The identity module 126 retrieves the access token assigned to that user identifier and passes the HTML request along with the access token to an endpoint of the secondary product platform pointed by the URL.

Upon receiving the request, the secondary product platform 130 and in particular the authorization module 135 determines whether the access identifier is valid and whether the corresponding user has permission to view the requested page at step 316. If the authorization module 135 determines that the identifier is valid and the user has permission to view the requested page, it retrieves the HTML for the page at step 318 and communicates it back to the proxy servlet 123.

At step 320, the proxy servlet 123 inspects the HTML and rewrites the HTML if it includes items such as images, metadata, links and documents links. In particular, if the HTML data includes URLs pointing to endpoints of the secondary product server to receive resources for the page (e.g., images, JAVASCRIPT, hyperlinked articles, attachments, and so on), it rewrites these URLs to ensure that any further resource requests for that page go to the shim servlet 125 instead of directly to the secondary product platform. This way, the shim servlet 125 can supplement each resource request with the user's access identifiers so that the requests can be properly handled by the secondary product platform 130.

In one example, if the HTML data includes a page URL such as https://applinks-confluence-bsiqueira.loca.It/pageskiewpage.action?pageId=65554, the proxy servlet 123 can rewrite this URL to https://bsiqueira.jira-dev.com/rest/servicedesk/knowledgebase/latest/articles/server/view/65554/agent/10081.

Similarly, an image attachment such as: https://applinks-confluence-bsiqueira.loca.It/download/attachments/65554/step-2-image-1.png can be rewritten as: https://bsiqueira.jira-dev.com/plugins/servlet/servicedesk/customer/confluence-server/agent/10081/shim/download/attachments/65554/step-2-image-1.png Next, at step 324, the proxy servlet 123 communicates the rewritten HTML to the iFrame. The iFrame in turn starts rendering the HTML and displaying the page in the iFrame. If there are any resources associated with the page present in the HTML, the iFrame starts making HTTP requests for the resources to the shim servlet 125 endpoints in the rewritten URLs (at step 324).

Some resources may be required to render the page (e.g., images or JAVASCRIPT components). Other resources may only be required if a user selects them—e.g., a hyperlink to another resource hosted by the secondary product platform. For each received resource request (whenever it is received), the shim servlet 125 retrieves the access identifier/token for the requesting user from the identity module 126 and adds the access identifier to a request for the resource. It communicates the request to the secondary product server endpoint provided in the original URL at step 326.

Upon receiving the request, the secondary product platform 130 once again determines whether the access identifier is valid and whether the corresponding user has permission to view the requested resource at step 328. If the secondary product platform 130 determines that the identifier is valid and the user has permission to view the requested page, it retrieves the requested resource and communicates it back to the shim servlet 125 at step 330.

At step 332, the shim servlet 125 communicates the resource to the iframe, which proceeds to render the resource on the client device 110.

Returning to steps 316 and 328, if at these steps, the secondary product platform 130 determines that the user does not have permission to view the page or the resource, the method proceeds to step 336, where an error message is generated and communicated to the proxy servlet 123 or shim servlet 125. The proxy or shim servlet 123. 125 in turn communicates the error message to the client 112 (at step 338) to be displayed in the iFrame (at step 340).

Figure 6:
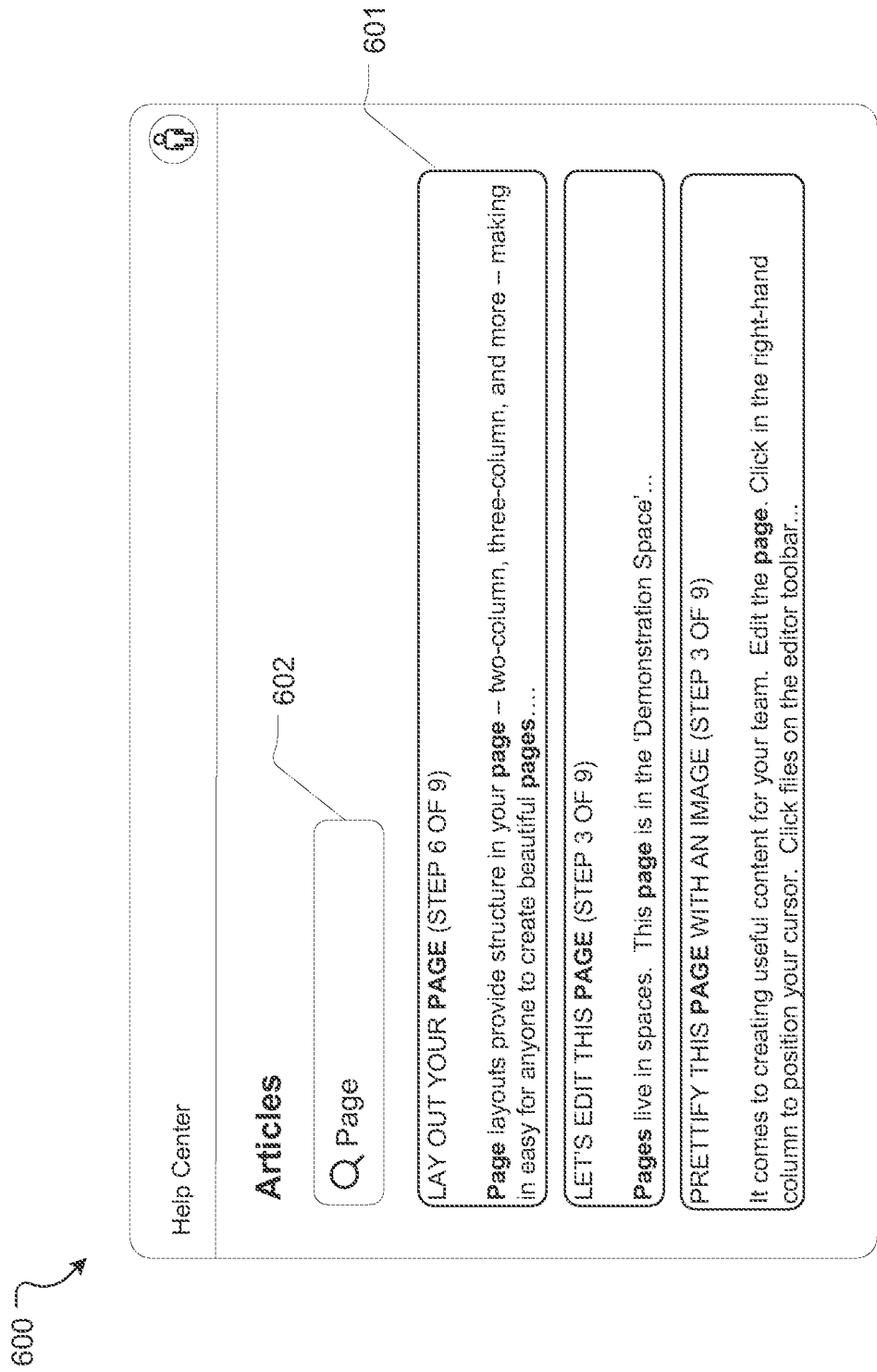
FIG. 6 is an example user interface rendered by the primary product client displaying a portal view user interface according to some aspects of the present disclosure.

In a different scenario, a registered or unregistered user (e.g., a customer) may be viewing a knowledge base portal associated with a given project on the client device 110. Further, the user may be logged into the portal system or may be viewing the portal system anonymously. FIG. 6 illustrates one such example user interface 600. The user interface 600 displays a list of articles 601 present in the knowledge base. The user interface 600 further includes a search bar 602 that can be used to search for articles with specific keywords. In this example, the user has searched for the word 'page', and the portal has retrieved and displayed three articles related to the word 'page'. The user may select one of the article/blog names from the list 601. For example, the user may select the article/blog, lay out your page (step 6 of 9)' from user interface 600. This selection initiates method 400.

At step 402, the client 112 generates and communicates a page details request to the primary product platform 120. The page details request may include, e.g., a unique identifier of the requested page, and a unique identifier associated with the portal through which the user wishes to access the page.

The method proceeds to step 404 where the primary product server 122 retrieves page details for the requested page. Examples of page details include secondary product platform page identifier, a URL for retrieving page HTML, identifier of the secondary product platform space the page is associated. This step is similar to step 306 and therefore is not described in detail again.

In addition to retrieving page details, the server 122 generates a portal URL for retrieving the page HTML at this step. This portal URL is constructed from the page identifier and the project key and/or space key associated with the page. Further, this URL points to an endpoint of the proxy servlet 123. In one example the portal URL may have the following format—

/servicedesk/knowledgebase/articles/server/view/
{pageid}/portal/{portalID}

The page ID and portal ID for the URL can be populated using the page ID and portal ID received from the client 112.

At step 406, the primary product server 122 communicates this portal URL to the client 112 in response to the page details request.

At step 408, the client 112 initializes an embedded viewer/iframe and passes the portal URL it received from the primary server 122 to the iFrame. The iFrame then sends a page request to the proxy servlet endpoint the URL points to at step 410. If the user is logged in, this request also includes the user identifier of the logged in user. Otherwise, if the user is anonymously browsing, the request does not include any user identifiers.

At step 412, the proxy servlet 123 is configured to generate and communicate a request to the secondary product platform 130 for HTML data for the requested page. However, before the proxy servlet 123 can communicate the request to the secondary product platform 130, at step 411, it determines whether the user is logged in or viewing the portal user interface anonymously. In one example, this determination is made by checking if the page request includes a user identifier. If the page request includes a user identifier, the proxy servlet 123 determines that the user is logged in. If the page request does not include a user identifier, the proxy servlet 123 determines that the user is viewing the portal interface anonymously.

If at step 411, it is determined that the user is logged in, the method proceeds to step 412 where the proxy servlet 123 retrieves dummy credentials from the database 124 and adds the dummy credentials to the request, which also includes the secondary product platform identifier for the page and the associated space identifier.

Upon receiving the request, the secondary product platform 130 and in particular the authorization module 135 determines whether the dummy credentials are valid and whether the corresponding user has permission to view the requested page (at step 414). If the authorization module 135 determines that the credentials are valid and the user has permission to view the requested page, it retrieves the HTML for the page and communicates it back to the proxy servlet 123 at step 416.

At step 418, the proxy servlet 123 inspects the HTML and rewrites the HTML if it includes items such as images, metadata, links and documents links. In particular, if the HTML data includes URLs pointing to endpoints of the secondary product server 132 to receive resources for the page (e.g., images, JAVASCRIPT, hyperlinked articles, attachments, etc.), it rewrites these URLs as portal URLs to ensure that any further resource requests for that page go to the shim servlet 125 instead of directly to the secondary product platform 130. This way, the shim servlet 125 can supplement each resource request with the user's access identifiers (if required) so that the requests can be properly handled by the secondary product platform 130.

The rewritten portal URLs may have the following format—

/servicedesk/customer/server/portal/{portalID}/shim

In one example, if the HTML data includes a page URL such as https://applinks-confluence-bsiqueira.loca.It/pages/viewpage.action?pageId=65553, the HTML proxy server can rewrite this URL to https://bsiqueira.jira-dev.com/rest/servicedesklknowledgebase/latest/articles/server/view/65553/portal/61.

Similarly, an image attachment such as: https://applinks-confluence-bsiqueira.loca.It/download/thumbnails/65553/step06-image01.png can be rewritten as: https://bsiqueira.jira-dev.com/plugins/servlet/servicedesk/customer/confluence-server/portal/61/shim/download/attachments/65553/step06-image02.png.

Next, at step 418, the proxy servlet 123 communicates the rewritten HTML to the iFrame. The iFrame in turn starts rendering the HTML and displaying the page in the iFrame (at step 420). If there are any resources associated with the page present in the HTML, the iFrame starts making HTTP requests for the resources to the shim servlet 125 endpoints in the rewritten URLs (at step 422).

For each received resource request (whenever it is received), the shim servlet 125 determines whether the user is logged in or not at step 423. If the shim servlet determines that the user is logged in, it retrieves the dummy credentials from the permissions database and adds the credentials to a request for the resource. It communicates the request to the secondary product server endpoint provided in the original URL at step 424.

Upon receiving the request, the secondary product platform 130 determines whether the dummy credentials are valid and whether the corresponding user has permission to view the requested resource (at step 426). If the secondary product platform 130 determines that the identifier is valid and the user has permission to view the requested page, it retrieves the requested resource and communicates it back to the shim servlet 125 (at step 428.

At step 430, the shim servlet 125 communicates the resource to the iframe, which proceeds to render the resource on the client device 110 (at step 432).

Returning to steps 414 and 426, if at these steps, the secondary product platform 130 determines that the user does not have permission to view the page or the resource, the method proceeds to step 434, where an error message is generated and communicated to the proxy servlet 123 or shim servlet 125. The proxy or shim servlet 123, 125 in turn communicates the error message to the client 112 (at step 436) to be displayed in the iFrame (at step 438).

Further, returning to steps 411 and 423, if at these steps, the proxy servlet 123 or the shim servlet 125 determines that the user is not logged in, the corresponding servlet 123 or 125 communicates the HTML or resource request to the secondary server 132 at step 413 and 435 respectively without any user credentials. Thereafter, the secondary server 132 determines whether the anonymous user has permission to view the requested HTML or resource at step 414 and 426 respectively and the rest of the method proceeds as described previously.

In the foregoing specification, embodiments of the present disclosure have been described with reference to numerous specific details that may vary from implementation to implementation. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps. Further, the terms "process" and "method" are interchangeably used.

Various features of the disclosure have been described using flowcharts. The functionality/processing of a given flowchart step could potentially be performed in various different ways and by various different systems or system modules. Furthermore, a given flowchart step could be divided into multiple steps and/or multiple flowchart steps could be combined into a single step. Furthermore, the order of the steps can be changed without departing from the scope of the present disclosure.

It will be understood that the embodiments disclosed and defined in this specification extends to all alternative combinations of two or more of the individual features mentioned or evident from the text or drawings. All of these different combinations constitute various alternative aspects of the embodiments.

What is claimed is:

1. A method comprising:
   receiving, at a documentation platform communicably coupled to a client device, a request for accessing a resource hosted by a secondary product platform separate from the documentation platform, the request received from the client device;
   in response to receiving the request for accessing the resource hosted by the secondary product platform, generating and forwarding, by the documentation platform, a uniform resource locator (URL) pointing to a proxy servlet of the documentation platform to the client device, the URL generated based on an identifier of the requested resource;
   receiving, from the client device, at the proxy servlet of the documentation platform, a request for HyperText Markup Language (HTML) data of the requested resource, the request directed to the secondary product platform;
   retrieving, by the proxy servlet of the documentation platform, from the secondary product platform, the HTML data of the requested resource;
   determining by the proxy servlet that the HTML data comprises a resource location pointing to the secondary product platform;
   rewriting, by the proxy servlet, the HTML data to change the resource location to a rewritten location pointing to a shim servlet of the documentation platform, the shim servlet different than the proxy servlet;
   receiving, from the client device, at the shim servlet, a request for one or more additional resources associated with the HTML data;
   retrieving, by the shim servlet, from the secondary product platform, the requested one or more resources;
   communicating the rewritten HTML data and the requested one or more additional resources to the client device for rendering in a user interface; and
   causing display of the user interface including a frontend associated with the documentation platform, the frontend having an embedded region rendering the rewritten HTML data.

2. The method of claim 1, further comprising:
   adding user credentials to the request for the one or more resources and communicating the request for the one or more resources to the secondary product platform.

3. The method of claim 2, further comprising determining that the request for the one or more additional resources is received from a first user interface of the client device and wherein the user credentials comprise an access token associated with a user of the client device, the access token allowing the documentation platform to request for one or more resources on behalf of the user from the secondary product platform.

4. The method of claim 2, further comprising determining that the request for the one or more additional resources is received from a second user interface of the client device and the user is logged into the documentation platform and wherein the user credentials comprise a dummy username and password.

5. The method of claim 2, further comprising:
   retrieving the one or more additional resources from the secondary product platform in response to the secondary product platform determining that the user has permission to access the requested resource based on the user credentials.

6. The method of claim 1, further comprising:
   adding user credentials to the request for HTML data of the requested resource and communicating the request for the HTML data to the secondary product platform.

7. The method of claim 6, further comprising:
   determining that the request for accessing the resource is received from a first user interface of the client device and wherein the user credentials comprise an access token associated with a user of the client device, the access token allowing the documentation platform to request resources on behalf of the user from the secondary product platform.

8. The method of claim 6, further comprising:
   determining that the request for accessing the resource is received from a second user interface of the client device and the user is logged into the documentation platform and wherein the user credentials comprise a dummy username and password.

9. The method of claim 6, further comprising: retrieving the HTML data of the requested resource from the secondary product platform in response to the secondary product platform determining that the user has permission to access the requested resource based on the user credentials.

10. The method of claim 1, wherein rewriting the HTML data comprises:
    inspecting the HTML data to determine whether the HTML data includes one or more URLs pointing to one or more additional resources; and
    upon determining that the HTML data includes one or more URLs pointing to the one or more additional resources, rewriting the one or more URLs to point to the shim servlet of the documentation platform.

11. A non-transitory computer readable medium comprising instructions, which when executed by a processor cause the processor to perform operations comprising:
    receiving, a request for accessing a resource hosted by a secondary product platform independent from a documentation platform, the request received from a client device;
    in response to receiving the request for accessing the resource hosted by the secondary product platform, generating and forwarding, by the documentation platform, a uniform resource locator (URL) pointing to a proxy servlet of the documentation platform to the client device, the URL generated based on an identifier of the requested resource;
    receiving, from the client device, at the proxy servlet of the documentation platform, a request for HyperText Markup Language (HTML) data of the requested resource;
    retrieving, by the proxy servlet of the primary platform, from the secondary product platform, the HTML data of the requested resource;
    rewriting, by the proxy servlet, the HTML data to change at least one resource location linked in the HTML data to a rewritten location pointing to a shim servlet of the documentation platform, the shim servlet different than the proxy servlet;
    receiving, from the client device, at the shim servlet, a request for one or more additional resources associated with the HTML data;
    retrieving, by the shim servlet, from the secondary product platform, the requested one or more resources;
    communicating the rewritten HTML data and the requested one or more additional resources to the client device for rendering in a user interface; and
    causing display of the user interface including a frontend associated with the documentation platform having an embedded region with rendered rewritten HTML data associated with the secondary product platform.

12. The non-transitory computer readable medium of claim 11, further comprising instructions, which when executed by a processor cause the processor to perform the operations of:
    adding user credentials to the request for HTML data of the requested resource and communicating the request for the HTML data to the secondary product platform.

13. The non-transitory computer readable medium of claim 12, further comprising instructions, which when executed by a processor cause the processor to perform the operations of:
    determining that the request for accessing the resource is received from a first user interface of the client device; and
    wherein the user credentials comprise an access token associated with a user of the client device, the access token allowing the documentation platform to request resources on behalf of the user from the secondary product platform.

14. The non-transitory computer readable medium of claim 12, further comprising instructions, which when executed by a processor cause the processor to perform the operations of:
    determining that the request for accessing the resource is received from a second user interface of the client device and the user is logged into the documentation platform, wherein the user credentials comprise a dummy username and password.

15. The non-transitory computer readable medium of claim 11, further comprising instructions, which when executed by a processor cause the processor to perform the operations of:
    inspecting the HTML data to determine whether the HTML data includes one or more URLs pointing to one or more additional resources; and
    upon determining that the HTML data includes one or more URLs pointing to the one or more additional resources, rewriting the one or more URLs to point to the shim servlet of the documentation platform.

16. The non-transitory computer readable medium of claim 11, further comprising instructions, which when executed by a processor cause the processor to perform the operations of:
    adding user credentials to the request for the one or more resources and communicating the request for the one or more resources to the secondary product platform.

17. The non-transitory computer readable medium of claim 16, further comprising instructions, which when executed by a processor cause the processor to perform the operations of:
    determining that the request for the one or more additional resources is received from a first user interface of the client device; and
    wherein the user credentials comprise an access token associated with a user of the client device, the access token allowing the documentation platform to request for one or more resources on behalf of the user from the secondary product platform.

18. The non-transitory computer readable medium of claim 16, further comprising instructions, which when executed by a processor cause the processor to perform the operations of:
    determining that the request for the one or more additional resources is received from a second user interface of the client device and the user is logged into the documentation platform, wherein the user credentials comprise a dummy username and password.

* * * * *